United States Patent
Schwarze et al.

(10) Patent No.: US 9,221,100 B2
(45) Date of Patent: Dec. 29, 2015

(54) OPTICAL IRRADIATION UNIT FOR A PLANT FOR PRODUCING WORKPIECES BY IRRADIATION OF POWDER LAYERS WITH LASER RADIATION

(75) Inventors: Dieter Schwarze, Paderborn (DE); Henner Schoeneborn, Luebeck (DE); Andreas Wiesner, Luebeck-Krummesse (DE)

(73) Assignee: SLM Solutions GmbH, Luebeck (DE)

( * ) Notice: Subject to any disclaimer, the term of this patent is extended or adjusted under 35 U.S.C. 154(b) by 605 days.

(21) Appl. No.: 13/513,598

(22) PCT Filed: Dec. 3, 2010

(86) PCT No.: PCT/EP2010/007361
§ 371 (c)(1),
(2), (4) Date: Jul. 31, 2012

(87) PCT Pub. No.: WO2011/066989
PCT Pub. Date: Jun. 9, 2011

(65) Prior Publication Data
US 2013/0064706 A1    Mar. 14, 2013

(30) Foreign Application Priority Data

Dec. 4, 2009   (EP) .................................. 09 015 074

(51) Int. Cl.
*B22F 3/105* (2006.01)
*B23K 26/067* (2006.01)
(Continued)

(52) U.S. Cl.
CPC .............. *B22F 3/003* (2013.01); *B22F 3/1055* (2013.01); *B23K 26/067* (2013.01); *B29C 67/0077* (2013.01); *C04B 35/64* (2013.01)

(58) Field of Classification Search
CPC ..... B22F 3/003; B22F 3/1055; B23K 26/067; B29C 67/0077; C04B 35/64; G02B 5/18; G02B 5/1814
USPC ......................................... 219/121.76, 121.77
See application file for complete search history.

(56) References Cited

U.S. PATENT DOCUMENTS 5,055,653 A * 10/1991 Funami et al. ........... 219/121.77
5,508,489 A *  4/1996 Benda et al. ............. 219/121.76
(Continued)

FOREIGN PATENT DOCUMENTS

JP         05-008070 A  *  1/1993
JP         7-266064 A   *  10/1995
(Continued)

OTHER PUBLICATIONS

Machine translation of Japan Patent document No. 5-008,070, Sep. 2014.*

(Continued)

*Primary Examiner* — Geoffrey S Evans
(74) *Attorney, Agent, or Firm* — Carter, DeLuca, Farrell & Schmidt, LLP (57) ABSTRACT

The present disclosure relates to an optical irradiation unit for a plant for producing workpieces by irradiating powder layers of a raw material powder with laser radiation, comprising optical components for guiding and focussing a beam path of a first laser beam, and an optical splitting and coupling unit for splitting the first laser beam into at least two laser sub-beams and/or for coupling a second laser beam with a wavelength differing from the wavelength of the first laser beam into the beam path of the first laser beam. The disclosure also relates to a plant for producing workpieces by irradiating powder layers of a raw material powder with laser radiation, and to an associated method.

20 Claims, 5 Drawing Sheets

(51) Int. Cl.
  *B22F 3/00*  (2006.01)
  *B29C 67/00*  (2006.01)
  *C04B 35/64*  (2006.01)

(56) References Cited

U.S. PATENT DOCUMENTS

| | | | |
|---|---|---|---|
| 6,452,132 B1 * | 9/2002 | Fuse | 219/121.73 |
| 6,643,300 B1 * | 11/2003 | Ori | 372/23 |
| 2003/0098295 A1 | 5/2003 | Kawamoto et al. | 219/121.66 |
| 2005/0029239 A1 * | 2/2005 | Matsumoto et al. | 219/121.72 |
| 2005/0150875 A1 | 7/2005 | Amako et al. | 219/121.63 |
| 2007/0183918 A1 * | 8/2007 | Monsheimer et al. | 419/1 |
| 2007/0248136 A1 | 10/2007 | Leonardo et al. | 372/22 |
| 2009/0032511 A1 * | 2/2009 | Adams et al. | 219/121.75 |
| 2011/0086441 A1 * | 4/2011 | Kawaguchi et al. | 219/121.73 |
| 2011/0259862 A1 * | 10/2011 | Scott et al. | 219/121.73 |

FOREIGN PATENT DOCUMENTS

| | | | |
|---|---|---|---|
| JP | 2001252986 A | | 9/2001 |
| JP | 2004-066745 A | * | 3/2004 |
| JP | 2004188604 A | | 7/2004 |
| JP | 2006027085 A | | 2/2006 |
| JP | 2006044017 A | | 2/2006 |
| WO | WO-95/18984 A1 | * | 7/1995 |
| WO | 01/96452 A2 | | 12/2001 |
| WO | 2006/024373 A2 | | 3/2006 |

OTHER PUBLICATIONS

Machine translation of Japan Patent document No. 2004-066,745, Mar. 2015.*
International Search Report No. PCT/EP2010/007361 dated Mar. 21, 2011.
Choi et al., "Ultrafast laser-induced processing of materials: fundamentals and applications in micromachining", Proceedings of SPIE, vol. 4637, (2002), pp. 204-211, Dec. 2002.
Ko et al., "High Resolution Selective Multilayer Laser Processing by Nanosecond Laser Ablation of Metal Nanoparticle Films", Journal of Applied Physics, vol. 102, Nov. 5, 2007, pp. 1-9.
Chanda et al., "Single Laser Exposure Fabrication of diamond-like 3-dimensional photonic crystal microstructures using circularly polarized light", Applied Physics A: Materials Science & Processing, vol. 93, Jun. 11, 2008, pp. 33-37.

* cited by examiner

OPTICAL IRRADIATION UNIT FOR A PLANT FOR PRODUCING WORKPIECES BY IRRADIATION OF POWDER LAYERS WITH LASER RADIATION

The present invention relates to an optical irradiation unit which is provided for a plant for producing three-dimensional workpieces by irradiating powder layers of a raw material powder with laser radiation. The invention relates further to a plant for producing workpieces by irradiating powder layers with laser radiation, in particular a laser melting or laser sintering plant, equipped with such an optical irradiation unit, and to an associated method.

Selective laser melting or laser sintering is an additive layering process by which pulverulent, in particular metallic and/or ceramic raw materials can be processed to three-dimensional workpieces of complex shapes. To that end, a raw material powder layer is applied to a support and subjected to laser radiation in a site-selective manner in dependence on the desired geometry of the workpiece that is to be produced. The laser radiation penetrating into the powder layer causes heating and consequently melting or sintering of the raw material powder particles. Further raw material powder layers are then applied successively to the layer on the support that has already been subjected to laser treatment, until the workpiece has the desired shape and size. Selective laser melting or laser sintering can be used in particular for the production of prototypes, tools, replacement parts or medical prostheses, such as, for example, dental or orthopaedic prostheses, on the basis of CAD data.

A plant known from EP 1 793 979 A1 for producing moulded bodies from pulverulent raw materials by selective laser melting comprises a process chamber which is maintained under a protective gas atmosphere and has a base plate, in which process chamber a plurality of supports is arranged. A powder layer preparation device comprises a powder reservoir holder which can be moved to and fro above the supports by means of a spindle drive and serves to apply raw material powder to the supports. The process chamber is divided by vertical partition walls into a plurality of process chamber compartments, for which a common irradiation device is provided. The irradiation device includes a laser, which provides laser radiation for a beam deflecting device via a fibre optical waveguide. The laser beam deflected by the beam deflecting device is focused by means of an F-theta lens on the powder layer last prepared on a particular support.

If the powder materials being used in the individual process chamber compartments of the known plant are different, the radiation intensity of the laser radiation can be adjusted for each compartment individually in order to take account of different material properties of the powders. In a corresponding manner, the irradiation wavelength can also be variable, and a spectrally adjustable laser or optionally a plurality of lasers of different emission wavelengths can be used for the irradiation of the powder layers in the different process chamber compartments.

Although such an arrangement takes account of different material properties of the powders in the different process chamber compartments, it does not reduce the problems that occur in the process chamber compartments. Owing to the high intensity of the laser radiation, the laser beam striking the powder layer causes not only the desired phenomenon of laser melting or laser sintering but also undesirable phenomena, such as the vaporisation of raw material powder and the occurrence of splashes during treatment. In addition, undesirable effects, such as high thermal gradients, in the raw material powder can affect the quality of the finished workpiece, in which, for example, the development of internal stresses can occur.

In order to reduce high internal stresses in SLM® (selective laser melting) or SLS (selective laser sintering) components or workpieces, attempts are conventionally made to preheat the raw material powder in order thus to reduce or eliminate the thermal gradients that lead to the high internal stresses. To that end it is known to generate a heat output in the plant beneath the base plate of the process chamber and transmit it into the powder by thermal conduction in order to preheat the powder. Because of its very low thermal conduction, the powder is usually more of an insulator than a thermal conductor. The raw material powder is accordingly preheated inefficiently and a large amount of heat output is lost.

It is an object of the present invention to provide an optical irradiation unit for a plant for producing workpieces by irradiating powder layers of a raw material powder with laser radiation as well as the plant itself and an associated method, by means of which efficient and optimised workpieces with improved properties can be produced.

The object is achieved by an optical irradiation unit having a plant for producing workpieces by irradiating powder layers of a raw material powder with laser radiation, and by an associated method. Advantageous further developments will become apparent in each case from the dependent claims.

An optical irradiation unit according to the invention for a plant for producing workpieces by irradiating powder layers of a raw material powder with laser radiation comprises optical components for guiding and focusing a beam path of a first laser beam, and an optical splitting and/or coupling unit. The optical splitting and/or coupling unit is designed to split the first laser beam into at least two laser sub-beams and/or to couple a second laser beam into the beam path of the first laser beam. In the first case of the splitting of the first laser beam into the at least two laser sub-beams, the optical splitting and/or coupling unit is designed, for example, to split the first laser beam into the at least two laser sub-beams in such a manner that the intensity of the laser sub-beams themselves is at least almost equally high, but the intensity of each laser sub-beam is different from the overall intensity of the first laser beam. In the second case of the coupling of the second laser beam into the beam path of the first laser beam, the optical splitting and/or coupling unit is designed to couple the second laser beam with a wavelength differing from the wavelength of the first laser beam into the beam path of the first laser beam. Preferably, the first laser beam has a wavelength of from 1050 nm to 1100 nm, in particular from 1064 nm to 1075 nm, and the second laser beam has a wavelength of from 800 nm to 1000 nm, in particular from 808 nm to 980 nm.

The optical splitting and/or coupling unit can be designed both to split the first laser beam and to couple the second laser beam. Alternatively, however, it can also have only an optical splitting unit, which is designed to split the first laser beam into the at least two laser sub-beams having an intensity which is preferably in each case equally high and differs from the intensity of the first laser beam. As a further alternative, it can be without an optical splitting unit for splitting the first laser beam but instead can have an optical coupling unit for coupling the second laser beam with a wavelength differing from the wavelength of the first laser beam into the beam path of the first laser beam.

For splitting the first laser beam into the at least two laser sub-beams, the optical splitting and/or coupling unit or the optical splitting unit of the optical splitting and/or coupling unit can have a diffractive optical element. The diffractive optical element is arranged, for example, in the beam path of the first laser beam and can produce a first beam profile (cross-sectional profile) of the first laser beam by splitting the first laser beam. A plurality of configurations are conceivable both for the beam profile of each laser sub-beam and for the overall beam profile of the first laser beam formed by all the laser sub-beams.

For example, each of the laser sub-beams produced by means of the diffractive optical element has a circular beam profile with Gaussian intensity distribution. In such a beam profile, the highest intensity of the beam is found at the centre of the circular laser sub-beam profile and decreases outwardly according to the Gaussian distribution. It is also conceivable for each laser sub-beam to produce a rectangular beam profile, in particular a square beam profile (a so-called top-hat beam profile), with uniform intensity distribution. In such a rectangular, in particular square, beam profile, the intensity of the laser radiation is at least almost equal at every point within the rectangular beam profile. If a powder layer of a raw material powder is subjected to this uniform intensity distribution, this leads to a uniform result on melting or sintering in all treatment situations. Process instabilities caused by locally occurring intensity peaks within the sub-beam profile are thereby avoided or at least reduced.

Independently of the laser sub-beam profiles that are produced, the optical splitting and/or coupling unit, especially the diffractive optical element arranged therein, can be designed to split the first laser beam into more than two, in particular into nine, laser sub-beams. The overall intensity of the first laser beam is preferably distributed evenly to each laser sub-beam by the splitting so that, where the first laser beam is split into nine laser sub-beams, each laser sub-beam has one ninth of the intensity of the first laser beam. For example, the diffractive optical element can form in different ways from the beam profiles of the at least two, for example nine, laser sub-beams an overall beam profile formed by the laser sub-beams in a plane perpendicular to the beam path of the first laser beam. Thus, in the case of nine laser sub-beams, the laser sub-beams can be split and arranged by the diffractive optical element in such a manner that an at least almost rectangular or square overall beam profile is produced in the plane perpendicular to the beam path.

The at least almost rectangular or square overall beam profile can be formed in each laser sub-beam profile in the case of both a Gaussian and a uniform intensity distribution. For example, the first laser beam is split into nine laser sub-beams in such a manner that in each case three laser sub-beams form the sides of the square, so that a square field of three times three laser sub-beams is produced.

In the case of laser sub-beams having a Gaussian intensity distribution, the overall beam profile of the first laser beam that is formed is preferably guided over a raw material powder layer in such a manner that, as a result of the non-uniform intensity distribution, locations that are initially irradiated less intensely are irradiated repeatedly. For example, the overall beam profile that is formed is guided over the powder layer in a sequentially overlapping manner in order to ensure uniform irradiation. In the case of rectangular laser sub-beam profiles with uniform intensity distribution (top-hat profiles), it is possible to dispense with such a sequential overlapping of the overall beam profile because there is an at least almost uniform intensity distribution not only in the laser sub-beams but also in the overall laser beam profile formed by the laser sub-beams. As a result, sequentially different, non-overlapping regions of the powder layer can be irradiated. In this manner, uniform melting or sintering of the powder layers can take place more quickly, resulting in more rapid and more efficient production of the workpieces.

In addition to the first diffractive optical element, the optical splitting and/or coupling unit or the optical splitting unit contained in the optical splitting and/or coupling unit can further have a second diffractive optical element for producing a second beam profile of the first laser beam that is different from the first beam profile. Both diffractive optical elements can be so designed that they can be brought into and out of the beam path of the first laser beam. For example, the first diffractive optical element is initially present in the beam path of the first laser beam and the second diffractive optical element, for example in response to an instruction from a control unit connected to the optical irradiation unit, is likewise brought into the beam path of the first laser beam. The second diffractive optical element can be brought into the beam path, for example folded into the beam path, in addition to the first diffractive optical element or can be brought into the beam path in place of the first diffractive optical element, the first diffractive optical element being, for example, folded out of the beam path when the second diffractive optical element is folded in.

For example, a different beam profile is desired for illuminating or irradiating the surface of the powder layer (in the so-called hatches) than for the outer contours (boundaries) of the workpiece to be formed. In conformity therewith, a different diffractive optical element can be folded into the beam path for the hatches than for the boundaries. In this manner, for example, the first diffractive optical element is brought into the beam path to produce the first beam profile for irradiating the hatches. In order to form the boundaries, the first diffractive optical element can be moved out of the beam path and the second diffractive optical element can be moved into the beam path in its place. In this manner, specific requirements that are made of the workpiece to be manufactured can be met in a flexible manner with the optical irradiation unit.

A plant according to the invention for producing workpieces by irradiating powder layers of a raw material powder with laser radiation comprises a support, to which powder layers of the raw material powder can be applied, an optical irradiation unit and a first radiation source for providing the first laser beam. The optical irradiation unit of the plant according to the invention for producing workpieces by irradiating powder layers of a raw material powder with laser radiation is an above-described optical irradiation unit according to the invention. The optical irradiation unit is designed and so arranged in the plant to irradiate a powder layer applied to the support with the laser sub-beams and/or with the coupling of the first and second laser beam in order to produce a workpiece from the raw material by an additive layering process.

During operation of the plant according to the invention, the first laser beam is guided over the raw material powder layer applied to the support so that the raw material layer applied to the support is subjected to or irradiated with laser radiation in a site-selective manner. The input of heat into the raw material powder layer caused by the irradiation with laser radiation has the effect that the individual particles of the raw material powder in the raw material powder layer are melted or sintered together, and construction of the workpiece layer by layer thus takes place.

The plant can have or be connected to a second radiation source for providing the second laser beam. The plant can further have a control device which is configured to control the optical irradiation unit in such a manner that the first laser beam and the second laser beam strike the powder layer at the same point. To this end, the control device, for example, gives instructions to the optical splitting and/or coupling unit or to the optical coupling unit contained therein and/or to the optical components, which, in response thereto, are so adjusted that the second laser beam is coupled into the beam path of the first laser beam so that the two laser beams strike the powder layer at the same point. The control device can also generate instructions which indicate that the first diffractive optical element, the second diffractive optical element or a further diffractive optical element are to be brought into the beam path of the first laser beam.

The control device preferably controls the optical irradiation unit in such a manner that the first laser beam and the second laser beam follow the same path on the powder layer. It is likewise conceivable for the first laser beam to follow the second laser beam with a fixed or adjustable offset or, conversely, for the second laser beam to follow the first laser beam with the fixed or adjustable offset. For example, there is used as the second laser beam in the melting or sintering process a commercially more advantageous diode laser beam with a wavelength of from 808 nm to 980 nm to support the first laser beam with a wavelength of from 1064 nm to 1075 nm. By combining the conventionally used ®® or SLS laser beam with the diode laser beam, similar melting or sintering results can be achieved on the powder surface with a lower outlay in terms of cost.

The second laser beam, for example the diode laser beam with a wavelength of from 808 nm to 980 nm, can also be used for site-selective preheating. The first laser beam is preferably focused on a specific focus point on the powder layer by the optical irradiation unit, while the second laser beam strikes the powder layer unfocused around the focus of the first laser beam. The first laser beam serves to melt or sinter the powder layer, while the second laser beam, for example the diode laser beam, is used for site-selective preheating. Preheating takes place in that the second laser beam, preferably a diode laser beam of 808 nm, strikes for local heating at the point of contact of the actual (first) laser beam, preferably a SLM® or SLS laser beam of 1075 nm. This site-selective preheating leads to a reduction in the thermal gradient at the preheated locations and accordingly to workpieces with lower internal stresses.

Instead of or in addition to the above-described site-selective preheating by means of the second laser beam, the plant can have a plurality of diode lasers, which are arranged above the powder layer applied to the support. Each of the plurality of diode lasers preferably emits diode laser radiation with a wavelength of from 808 nm to 980 nm in order thus to preheat homogeneously at least almost every point of the powder layer and consequently at least almost the entire powder layer. By means of both this homogeneous preheating and the site-selective preheating by means of the second laser beam, the powder surface can be homogeneously heated directly and immediately without additionally giving off heat to the chamber walls. During the coating of the support or plurality of supports with the powder, the power of the laser diodes can be reduced to a minimum or optionally switched off altogether in order to reduce or prevent heating of the coater and the unintentional action of radiation on other regions via reflections on metal walls.

In contrast to preheating by means of the heat input generated beneath the base plate, the powder surface is preheated directly both in the case of site-selective and in the case of homogeneous preheating. This more efficient preheating of the powder eliminates or at least reduces thermal gradients, so that the occurrence of internal stresses in the workpieces is avoided or at least reduced.

In the method according to the invention for producing workpieces by irradiating powder layers of a raw material powder with laser radiation, a powder layer of the raw material powder is applied to a support, a first laser beam is split into at least two laser sub-beams and/or a second laser beam with a wavelength differing from the wavelength of the first laser beam is coupled into the first laser beam, and the powder layer applied to the support is irradiated with the laser sub-beams and/or with the coupling of the first and second laser beams in order to produce a workpiece from the raw material by an additive layering process. The at least two laser sub-beams preferably each have an intensity which is at least almost equally high and differs from the intensity of the first laser radiation.

Preferred embodiments of the invention are explained in greater detail by means of the accompanying schematic drawings, in which.

Figure 1:
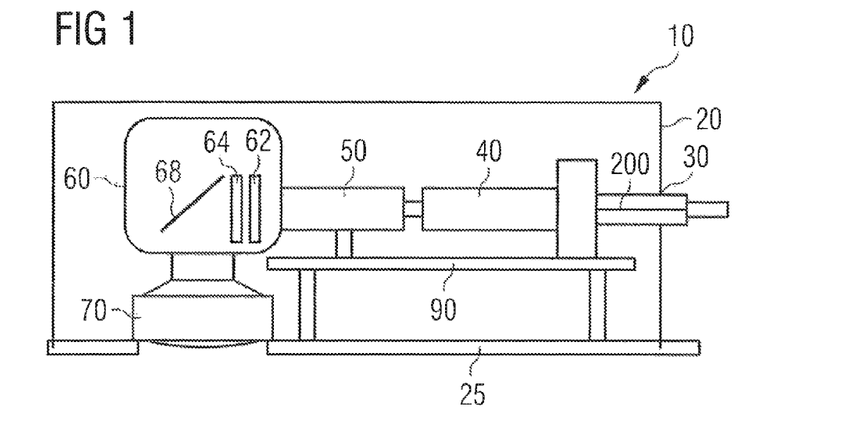
FIG. 1 shows schematically a first embodiment of an optical irradiation unit.

FIG. 1 shows a first embodiment of an optical irradiation unit 10 for a plant for producing workpieces by irradiating powder layers of a raw material powder with laser radiation. The optical irradiation unit 10 has a hermetically sealable housing 20 with a fixed base plate 25. An SLM® or SLS laser beam 200 is provided in the optical irradiation unit 10 via an opening 30. The SLM® or SLS laser beam 200 has a wavelength of 1075 nm. On a rail 90 there are displaceably arranged as optical components a beam expander 40 for expanding the SLM® or SLS laser beam 200 and a focusing lens 50 for focusing the SLM® or SLS laser beam 200 at a focus point.

The optical irradiation unit 10 further has a scanner unit 60 and an object lens 70. According to the first embodiment of the optical irradiation unit 10, the scanner unit 60 and the object lens 70 are shown by way of example in the form of a galvanometer scanner and an F-theta object lens. By means of the scanner unit 60, the position of the focus of the SLM® or SLS laser beam 200 both in the direction of the beam path and in a plane perpendicular to the beam path can be changed and adapted.

Figure 2:
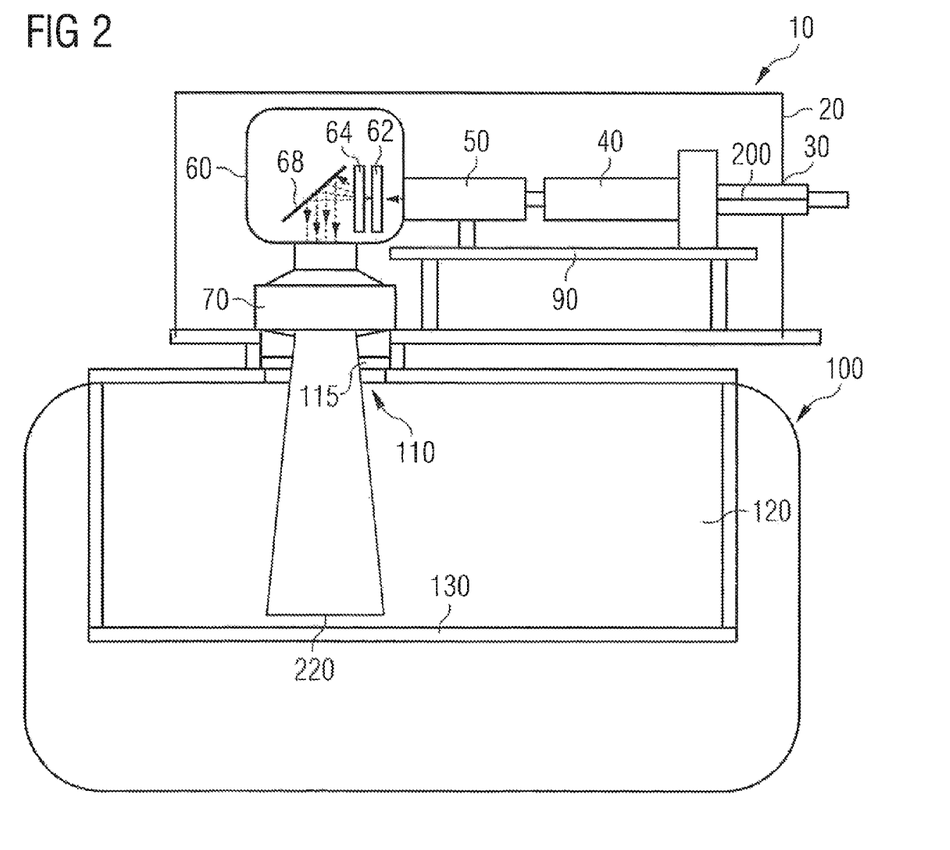
FIG. 2 shows, in schematic form, the first embodiment shown in FIG. 1 of an optical irradiation unit as part of a plant for producing workpieces.

FIG. 2 shows schematically how the optical irradiation unit 10 is connected to a plant 100 for producing workpieces by irradiating powder layers of a raw material powder with laser radiation so that the SLM® or SLS laser beam 200 provided by the optical irradiation unit 10 is fed through a window 110 of a powder chamber 120 of the plant 100. As shown in FIG.

2, the beam expander 40, the focusing unit 50, the scanner unit 60 and the objective lens 70 are so designed and arranged that the beam profile 220 of the SLM® or SLS laser beam 200 strikes a powder layer of a raw material powder applied to a support 130 of the plant 100. The window 110 is hermetically closed by a 15 mm thick quartz plate 115, which is permeable to laser light of the chosen laser radiation of 1075 nm.

The scanner unit 60 has two diffractive optical elements 62, 64, which can be folded into the beam path of the SLM® or SLS laser beam 200 in order to split the SLM® or SLS laser beam 200 into a plurality of laser sub-beams. According to the first embodiment shown in FIGS. 1 and 2, the diffractive optical elements 62, 64 are arranged in front of a deflection mirror 68 for deflecting the laser sub-beams. It is likewise possible to arrange the diffractive optical elements 62, 64 behind the deflection mirror 68. The first diffractive optical element 62 is then brought into the beam path of the SLM® or SLS laser beam 200 when illumination of the powder layer over the surface (in the hatches) takes place. The second diffractive optical element 64, on the other hand, is brought into the beam path (while the first diffractive optical element 62 is folded out of the beam path) when the outer contours (boundaries) of the workpiece to be manufactured are being produced. Two examples of how the first diffractive optical element 62 splits the SLM® or SLS laser beam 200 into sub-beams are discussed in relation to FIGS. 3 to 5.

Figure 3:
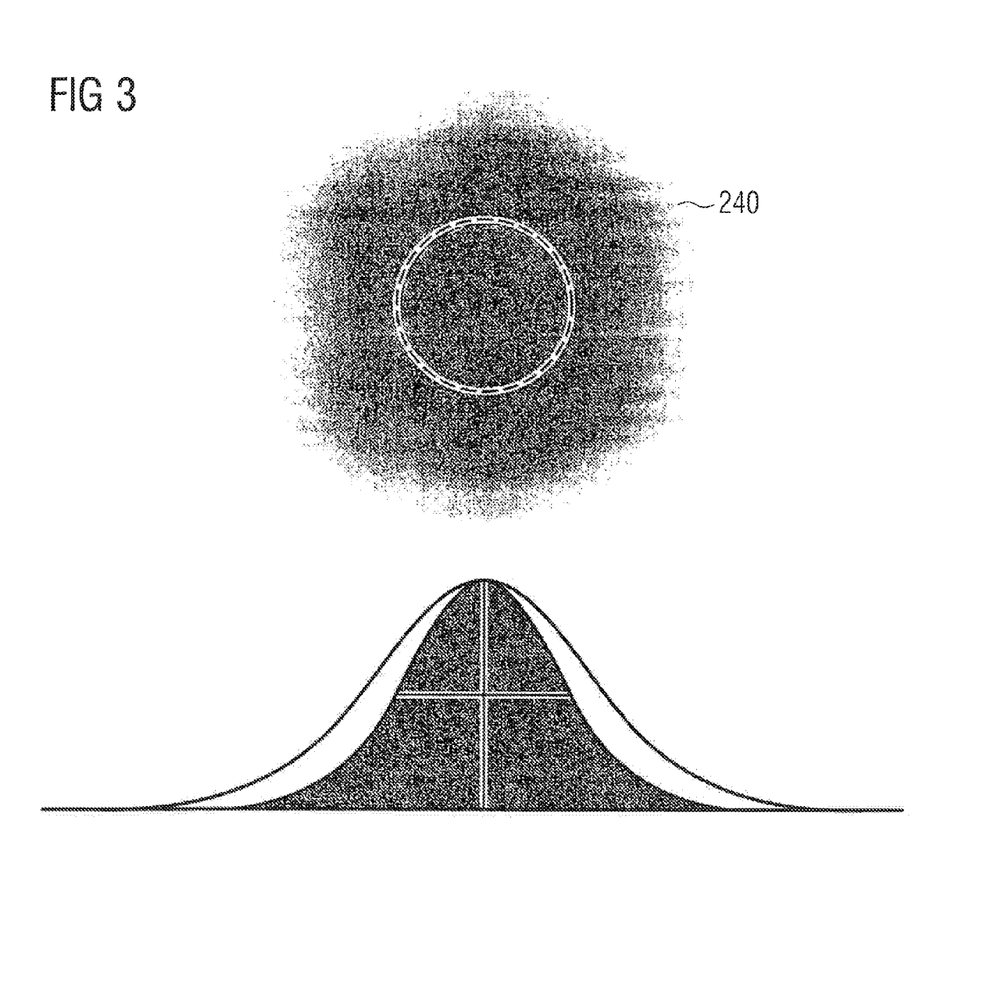
FIG. 3 shows, in schematic form, a sub-beam profile produced by means of the first embodiment of an optical irradiation unit shown in FIG. 1.
Figure 4:
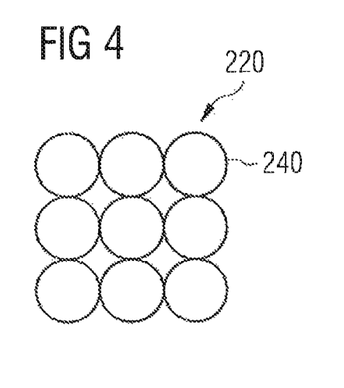
FIG. 4 shows, in schematic form, an overall beam profile produced by means of the first embodiment of an optical irradiation unit shown in FIG. 1.
Figure 5:
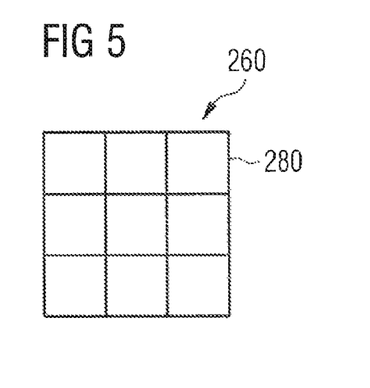
FIG. 5 shows, in schematic form, a further overall beam profile produced by means of the first embodiment of an optical irradiation unit shown in FIG. 1.

FIG. 3 shows schematically a laser sub-beam profile 240 of one of the plurality of laser sub-beams produced by the first diffractive optical element 62 from the SLM® or SLS laser beam 200. As shown in FIG. 3, the laser sub-beam has as the beam profile 240 a profile with Gaussian distribution. This means that the intensity of the circular sub-beam profile 240 has a maximum at its centre and decreases outwardly according to the Gaussian bell curve. If the SLM® or SLS laser beam 200 is split by the first diffractive optical element 62 into nine such laser sub-beams, an overall beam profile 220 as shown schematically in FIG. 4 and formed by the nine sub-beam profiles (subsidiary beam profiles) 240 is produced. Each of the sub-beams has approximately one ninth of the intensity of the single laser beam (of the SLM® or SLS laser beam 200). Accordingly, the overall intensity of the SLM® or SLS laser beam 200 is at least almost retained but is distributed over the area of a plurality of laser sub-beams (in the case of FIGS. 4 and 5 shown by way of example over nine laser sub-beams). In this manner, a larger region of the powder layer can be irradiated. The overall beam profile 220 formed by the nine laser sub-beam profiles 240 shown in FIG. 4 describes a square field consisting of three times three subsidiary beam profiles 240. Because of the Gaussian intensity distribution in each laser sub-beam profile 240, the intensity in the overall beam profile 220 covers a larger area than in the single beam profile of the SLM® or SLS laser beam 200 but is not distributed exactly uniformly and, compared with the single beam profile, has attenuated intensity maxima and intensity minima.

In order to produce a more homogeneous beam profile both in the sub-beams and in the overall beam profile 220 formed by the sub-beams, the first diffractive optical element 62 can be designed so that it produces not the overall beam profile 220 sketched in FIG. 4 (formed of the sub-beam profiles 240 with Gaussian intensity distribution) but the overall beam profile 260 shown schematically in FIG. 5 with the sub-beam profiles 280. The sub-beam profiles 280 of FIG. 5 are each in the form of a so-called top-hat profile and have a uniform intensity distribution over the entire sub-beam profile 280 (cross-section of the laser sub-beam). As a result, the overall beam profile 260 formed by the individual sub-beam profiles 280 (as shown in FIG. 5) has a uniform intensity distribution. In this manner, a larger region of the powder layer can be irradiated simultaneously than without splitting of the SLM® or SLS laser beam 200, which increases the speed of the production process and accordingly the productivity. In addition, intensity peaks are reduced or avoided, because the overall intensity of the SLM® or SLS laser beam 200 is distributed homogeneously over a larger surface.

The beam profiles shown in FIGS. 4 and 5 are both suitable for treatment (illumination or irradiation) over the surface in the hatches of the powder layer and can each be produced by a correspondingly designed first diffractive optical element 62. For treatment of the outer contours, the second diffractive optical element 64 is folded into the beam path in place of the first diffractive optical element 62. The second diffractive optical element 64 can also be designed to form one of the beam profiles shown in FIGS. 4 and 5.

Figure 6:
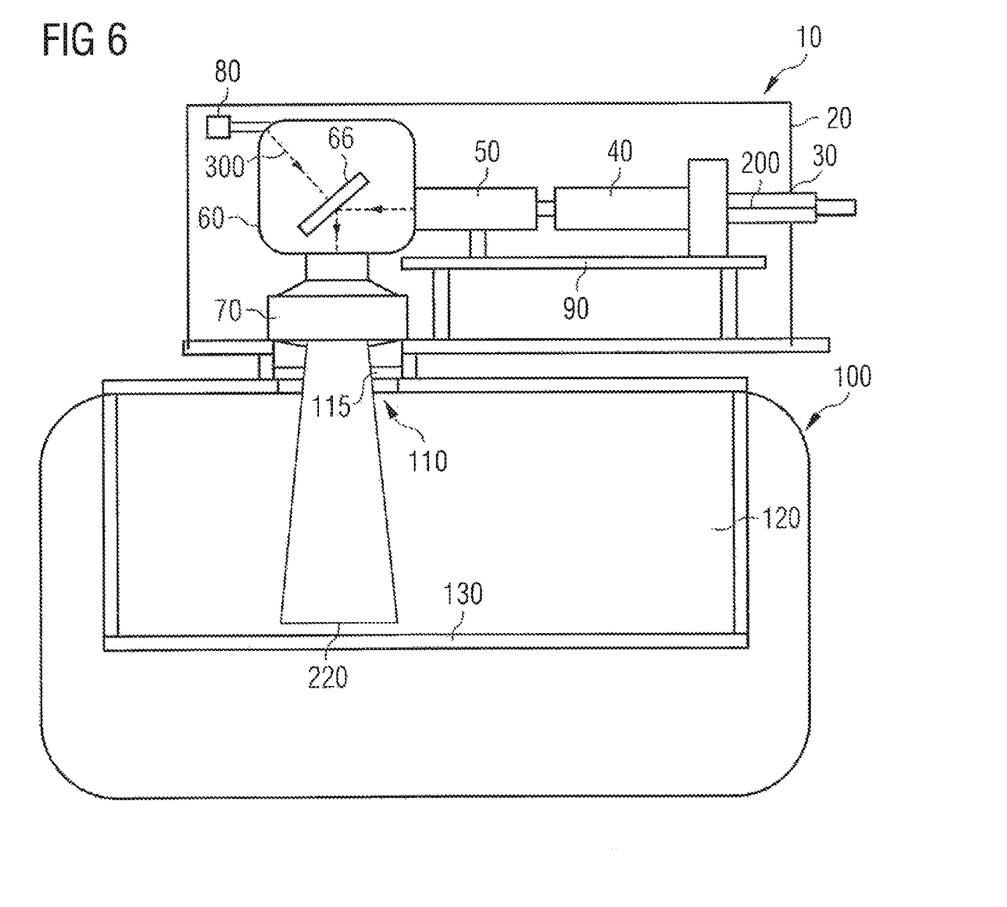
FIG. 6 shows, in schematic form, a second embodiment of an optical irradiation unit as part of a plant for producing workpieces.
Figure 6A:
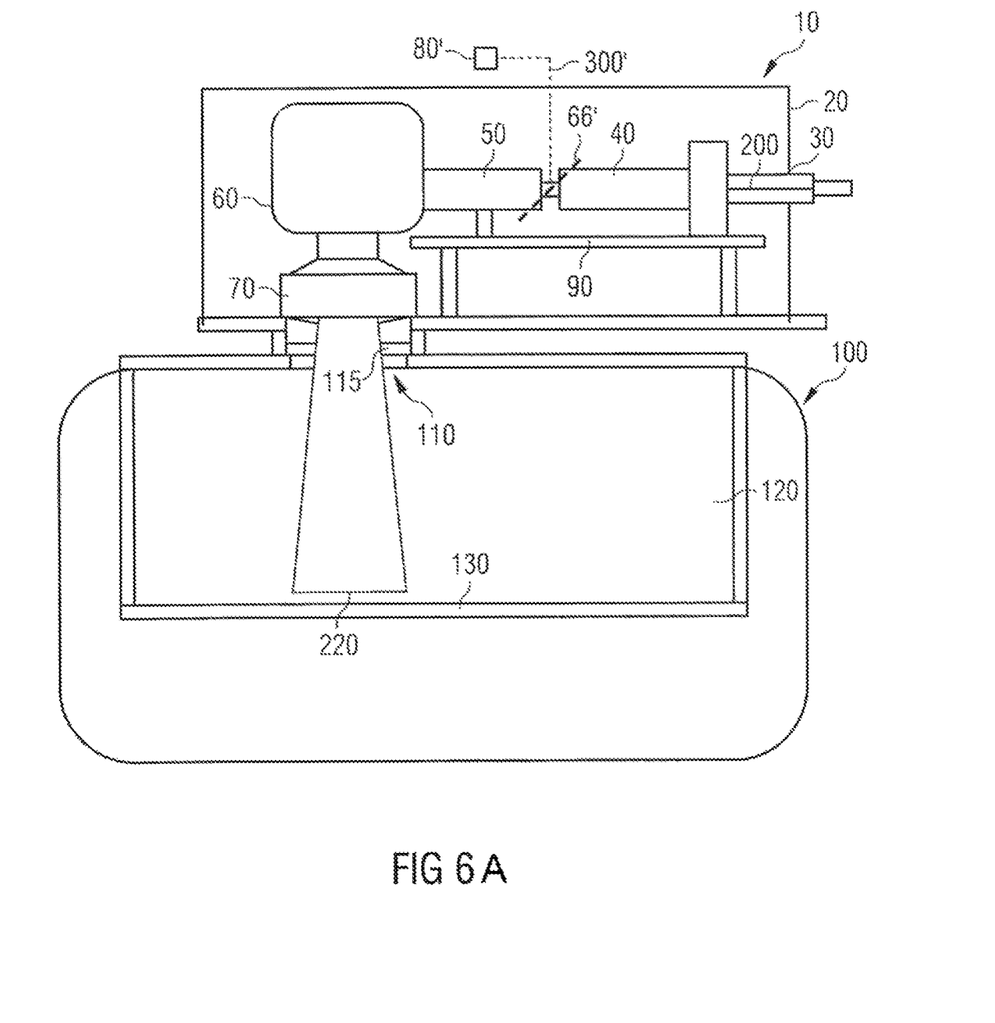
FIG. 6A shows, in schematic form, another embodiment of an optical irradiation unit as part of a plant for producing workpieces as shown in FIG. 6.

FIG. 6 shows, in schematic form, a second embodiment of an optical irradiation unit 10 as part of a plant 100 for producing workpieces. Instead of the first and second diffractive optical elements 62, 64, the scanner unit 60 according to the second embodiment of the optical irradiation unit 60 has a coupling mirror 66. Via the coupling mirror 66, a diode laser beam 300 supplied from the outside is brought into the beam path of the SLM® or SLS laser beam 200, as required. The diode laser beam 300 is provided by a diode laser 80 and has a wavelength of 808 nm. As an alternative to the diode laser 80 and the coupling mirror 66, a diode laser beam 300' can be produced by a diode laser 80' and, as shown in FIG. 6A, coupled into the beam path of the SLM® or SLS laser beam 200 via the coupling mirror 66' arranged between the beam expander 40 and the focusing lens 50. Because the diode laser beam 300, 300' has a wavelength that differs by more than 200 nm from that of the SLM® or SLS laser beam 200, the window 110 is designed to let pass both a wavelength of the SLM® or SLS laser beam 200 in the region of 1075 nm and a wavelength of the diode laser beam 300, 300' in the region of 808 nm.

The diode laser beam 300, 300' is coupled into the SLM® or SLS laser beam 200 via the coupling mirror 66, 66' in such a manner that it strikes the powder layer at the same point and is guided on the powder layer along the same path as the SLM® or SLS laser beam 200. Because the coupling mirror 66 is arranged behind the focusing unit 50, only the SLM® or SLS laser beam 200 is focused, while diode laser beam 300 strikes the powder surface unfocused around the focus point of the SLM® or SLS laser beam 200. As a result, this point on the powder layer is preheated in a site-selective manner by the diode laser beam 300. The site-selective preheating by means of the diode laser beam 300 as a result of the local heating at the point of contact of the SLM® or SLS laser beam 200 leads to a reduction in the thermal gradient in the powder layer, which is a cause of high internal stresses in SLM® or SLS workpieces. By reducing or eliminating the thermal gradients as a result of site-selective local preheating, workpieces having better properties can be produced.

As an alternative to the use of the diode laser beam 300 for preheating at the focus point of the SLM® or SLS laser beam 200, it is also conceivable likewise to focus the diode laser beam 300' at a focus point (this happens because the coupling mirror 66' is arranged in front of the focusing unit 50). The focused diode laser beam 300' can then be guided before the SLM® or SLS laser beam 200 or after the SLM® or SLS laser beam 200 for the irradiation (and accordingly melting or sintering) of the powder layer.

Figure 7:
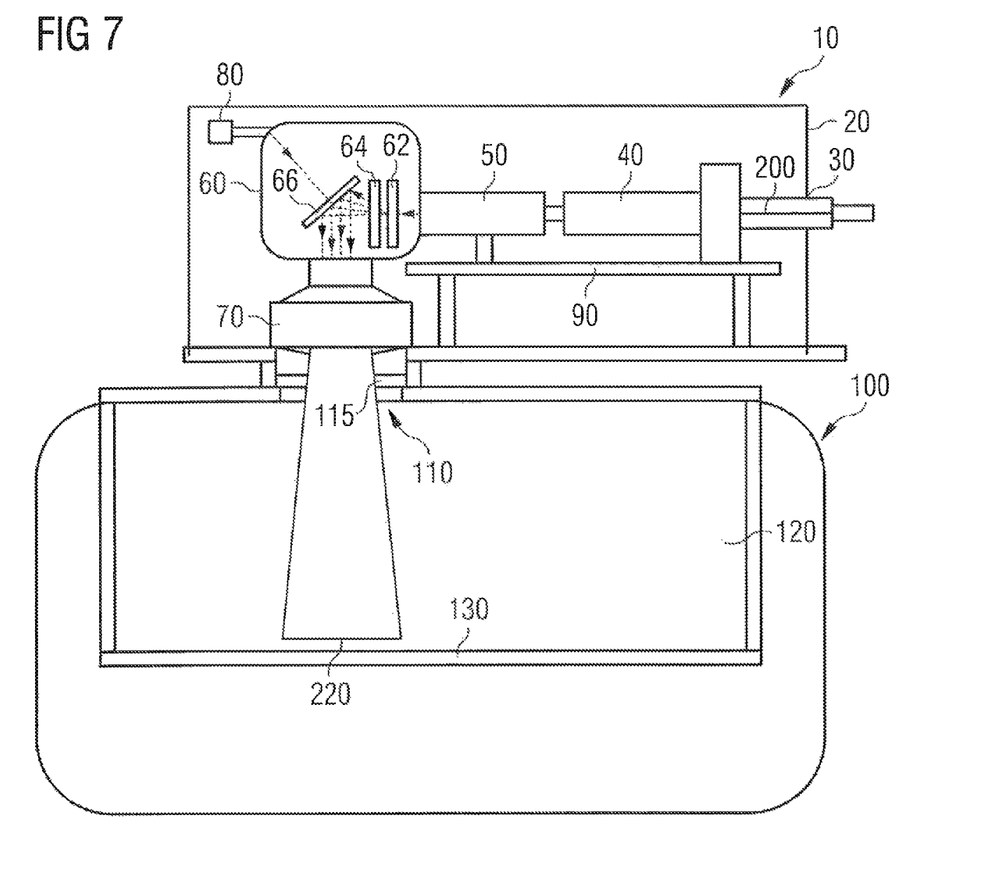
FIG. 7 shows, in schematic form, a third embodiment of an optical irradiation unit as part of a plant for producing workpieces.

FIG. 7 shows, in schematic form, a third embodiment of an optical irradiation unit 10 as part of a plant 100 for producing workpieces, which constitutes a combination of the first embodiment of FIGS. 1 and 2 and the second embodiment of FIG. 6. In the third embodiment, the two diffractive optical elements 62, 64 are also arranged in the scanner unit 60 in addition to the coupling mirror 66. As described above, the intensity distribution of the SLM® or SLS laser beam 200 is homogenised by means of the diffractive optical elements 62, 64. As a modification of the third embodiment it is conceivable to change the order of the coupling mirror 66 and the two diffractive optical elements 62, 64 in the direction of the beam path of the SLM® or SLS laser beam 200 so that the diode laser beam 60 is first coupled into the SLM® or SLS laser beam 200 by means of the coupling mirror 66 and the coupling of the diode laser beam 300 and the SLM® or SLS laser beam 200 is homogenised by means of the diffractive optical elements 62, 64 in the manner described above. It is also conceivable to arrange the coupling mirror 66' in front of the focusing unit 50, as shown in FIG. 6A.

The invention claimed is:

1. An optical irradiation unit for a plant for producing workpieces by irradiating powder layers of a raw material powder with laser radiation, comprising:
   optical components for guiding and focusing a beam path of a first laser beam;
   an optical splitting unit for splitting the first laser beam into at least two laser sub-beams having an intensity which in each case is equal and differs from the intensity of the first laser beam, wherein the optical splitting unit produces a first beam profile of the first laser beam by splitting the first laser beam into the at least two laser sub-beams; and
   an optical coupling unit configured to couple a second laser beam with a wavelength differing from a wavelength of the first laser beam into the beam path of the first laser beam.

2. The optical irradiation unit according to claim 1, wherein the first laser beam comprises a wavelength of from 1064 nm to 1075 nm and the second laser beam comprises a wavelength of from 808 nm to 980 nm.

3. The optical irradiation unit according to claim 1, wherein the optical splitting unit includes a diffractive optical element for producing the first beam profile of the first laser beam by splitting the first laser beam into the at least two laser sub-beams.

4. The optical irradiation unit according to claim 3, wherein the optical splitting unit further includes a second diffractive optical element for producing a second beam profile of the first laser beam that differs from the first beam profile by splitting the first laser beam into the at least two laser sub-beams.

5. The optical irradiation unit according to claim 3, wherein the first and/or the second diffractive optical element is movable into the beam path of the first laser beam in response to an instruction from a control unit connected to the optical irradiation unit.

6. The optical irradiation unit according to claim 1, wherein each laser sub-beam includes a circular beam profile with Gaussian intensity distribution.

7. The optical irradiation unit according to claim 6, wherein the optical splitting unit is configured to split the first laser beam into nine laser sub-beams having an intensity which in each case is equal and differs from the intensity of the first laser beam, in such a manner that the beam profiles of the nine laser sub-beams form an at least almost square overall beam profile in a plane perpendicular to the beam path of the first laser beam.

8. A plant for producing workpieces by irradiating powder layers of a raw material powder with laser radiation, comprising:
   a support to which powder layers of the raw material powder can be applied;
   an optical irradiation unit comprising:
   optical components for guiding and focusing a beam path of a first laser beam;
   an optical splitting unit for splitting the first laser beam into at least two laser sub-beams having an intensity which in each case is equal and differs from the intensity of the first laser beam, wherein the optical splitting unit produces a first beam profile of the first laser beam by splitting the first laser beam into the at least two laser sub-beams; and
   an optical coupling unit configured to couple a second laser beam with a wavelength differing from a wavelength of the first laser beam into the beam path of the first laser beam; and
   a first radiation source for providing the first laser beam;
   wherein the optical irradiation unit is designed and arranged to irradiate a powder layer applied to the support with the laser sub-beams of the first laser beam in order to produce a workpiece from the raw material by an additive layering process.

9. The plant according to claim 8, wherein the plant further includes a plurality of diode lasers which are so arranged above the powder layer and configured to preheat the powder layer homogeneously with their diode laser radiation.

10. The plant according to claim 8, wherein the optical irradiation unit is configured to irradiate the powder layer with the coupling of the first and the second laser beam in order to produce a workpiece from the raw material by an additive layering process.

11. The plant according to claim 10, wherein the plant further includes a second radiation source for providing the second laser beam.

12. The plant according to claim 10, wherein the optical irradiation unit is configured in such a manner that the first laser beam and the second laser beam strike the powder layer at the same point.

13. The plant according to claim 12, wherein the optical irradiation unit is configured in such a manner that the first laser beam and the second laser beam describe a same path on the powder layer.

14. The plant according to claim 12, wherein the optical irradiation unit is configured in such a manner that the second laser beam strikes the powder layer unfocused around a focus of the first laser beam.

15. A method for producing workpieces by irradiating powder layers of a raw material powder with laser radiation, comprising:
   providing a plant for producing workpieces by irradiating powder layers of a raw material powder with laser radiation, comprising:
   a support to which powder layers of the raw material powder can be applied;
   an optical irradiation unit comprising:
   optical components for guiding and focusing a beam path of a first laser beam;
   an optical splitting unit for splitting the first laser beam into at least two laser sub-beams having an intensity which in each case is equal and differs from the intensity of the first laser beam, wherein the optical splitting unit produces a first beam profile of the first laser beam by splitting the first laser beam into the at least two laser sub-beams; and an optical coupling unit configured to couple a second laser beam with a wavelength differing from a wavelength of the first laser beam into the beam path of the first laser beam; and a first radiation source for providing the first laser beam;

applying a powder layer of the raw material powder to the support;

splitting a first laser beam into at least two laser sub-beams having an intensity which in each case is equal and differs from the intensity of the first laser beam, in order to produce a first beam profile of the first laser beam by splitting the first laser beam into the at least two laser sub-beams; and irradiating the powder layer applied to the support with the laser sub-beams of the first laser beam in order to produce a workpiece from the raw material by an additive layering process.

16. The method according to claim 15, wherein the irradiating step includes irradiating the powder layer applied to the support with the coupling of the first and the second laser beam in order to produce a workpiece from the raw material by an additive layering process.

17. An optical irradiation unit for a plant for producing workpieces by irradiating powder layers of a raw material powder with laser radiation, comprising:

optical components for guiding and focusing a beam path of a first laser beam; and an optical splitting unit for splitting the first laser beam into a plurality of laser sub-beams having an intensity which in each case is equal and differs from the intensity of the first laser beam, wherein the plurality of laser sub-beams form an almost square overall beam profile in a plane perpendicular to the beam path of the first laser beam, wherein each laser sub-beam includes a rectangular beam profile with uniform intensity distribution.

18. The optical irradiation unit according to claim 17, wherein the plurality of laser sub-beams consists of nine laser sub-beams.

19. An optical irradiation unit for a plant for producing workpieces by irradiating powder layers of a raw material powder with laser radiation, comprising:

optical components for guiding and focusing a beam path of a first laser beam; and an optical splitting unit for splitting the first laser beam into a plurality of laser sub-beams having an intensity which in each case is equal and differs from the intensity of the first laser beam, wherein the plurality of laser sub-beams form an almost square overall beam profile in a plane perpendicular to the beam path of the first laser beam, and wherein each laser sub-beam includes a circular beam profile with Gaussian intensity distribution.

20. The optical irradiation unit according to claim 19, wherein the plurality of laser sub-beams consists of nine laser sub-beams.

* * * * *